Patented Nov. 24, 1925.

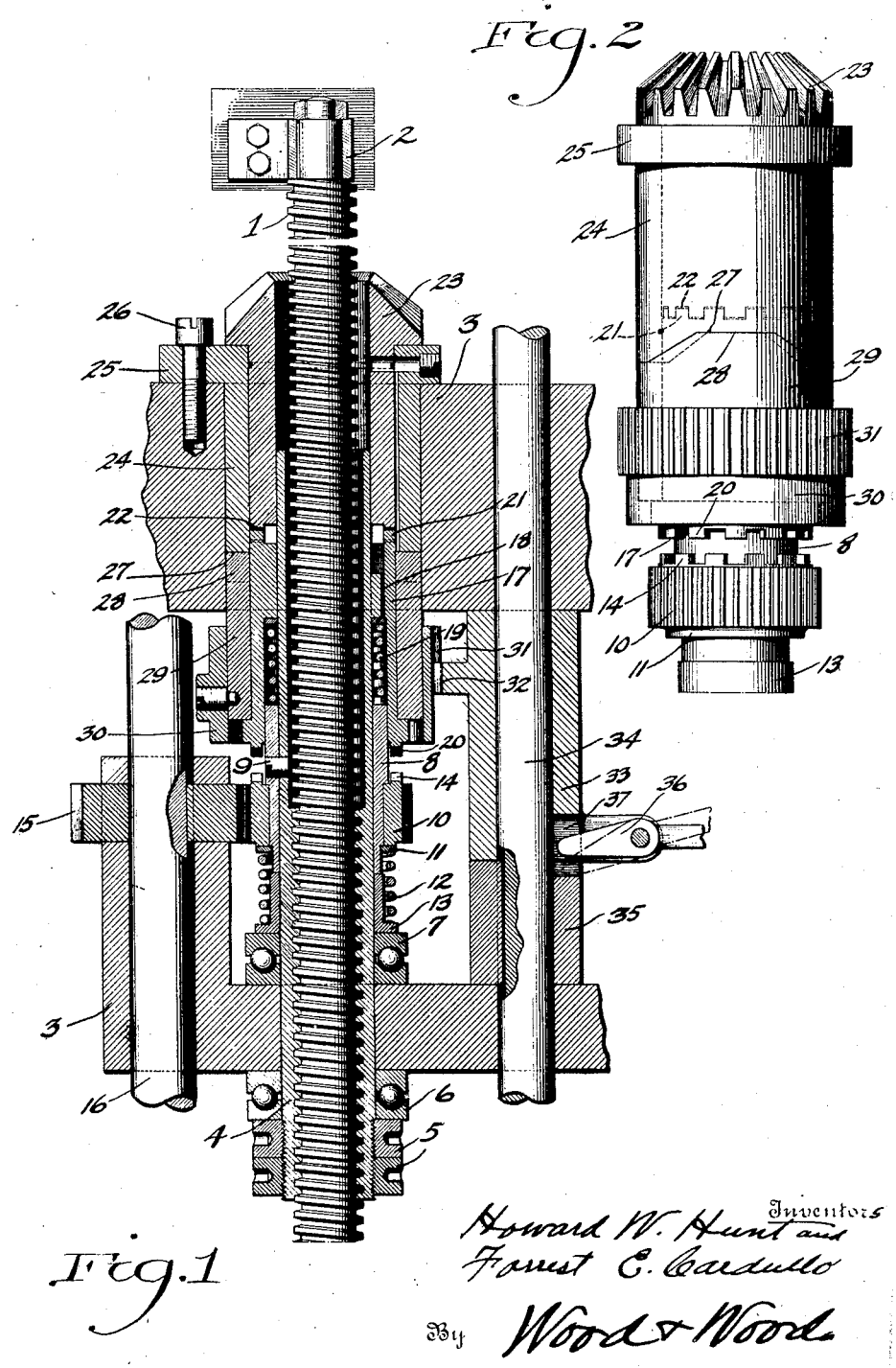

1,562,831

UNITED STATES PATENT OFFICE.

HOWARD W. HUNT AND FORREST E. CARDULLO, OF CINCINNATI, OHIO, ASSIGNORS TO THE G. A. GRAY COMPANY, OF CINCINNATI, OHIO, A CORPORATION OF OHIO.

CLUTCH MECHANISM.

Original application filed August 8, 1921, Serial No. 490,453. Divided and this application filed March 12, 1924. Serial No. 698,705.

*To all whom it may concern:*

Be it known that we, HOWARD W. HUNT and FORREST E. CARDULLO, citizens of the United States, and residing at Cincinnati, in the county of Hamilton and State of Ohio, have invented a new and useful Improvement in Clutch Mechanism, of which the following specification is a full disclosure.

This invention relates to an improvement in clutches of the toothed type, in which a movable clutch member is slid between two transmitting clutch members with which it is adapted to be alternately connected.

An advantage of the invention is to provide a simple and efficient clutch for alternately connecting two driving members to a driven member, the clutch being slid or translated from a first position to a second by a rotatable member concentric with the clutch members and having one end in the form of a cam. The mechanism is adapted to permit the return movement to be accomplished automatically.

Other features and advantages of the invention will be more fully set forth in the description of the accompanying drawings forming a part of this specification, in which:

Figure 1 is a central longitudinal section through the clutch mechanism, clutch controlling mechanism and gearing, the clutch mechanism and gearing being concentric with a screw.

Figure 2 is a side elevation of the clutch mechanism and clutch gearing.

In the mechanism illustrated, the clutches are employed to rotate a nut engaging a screw, for the purpose of translating a tool holding side head of a planer. In the particular structure shown, the invention is divisional from a prior application filed by us August 8th, 1921, Serial Number 490,453, for transmission mechanism for machine tools.

Referring to the drawings, 1 is a stationary screw supported in bracket 2 in such a manner as to prevent the rotation of the screw, bracket 2 being fixed to the frame of the machine of which the mechanism is part. This screw extends through a casting 3 which forms a frame adapted to support the mechanism to be described, and which is attached securely to the tool head or other part which is to be moved upon the frame of the machine. Only those parts of frame 3 are shown which are necessary to an understanding of the mechanism.

Upon the screw 1 is mounted tubular nut 4, in frame 3. The end thrusts of nut 4 are taken by antifriction bearings 6 and 7, and the nut secured against endwise movement in the frame by lock nuts 5, 5. Fastened securely to nut 4 is sleeve 8, which is attached by screw 9. Upon this sleeve, and concentric therewith, is gear 10, which may rotate freely upon the sleeve, but which is normally restrained from axial movement by a shoulder formed on the sleeve and washer 11. Washer 11 is forced against a second shoulder formed on sleeve 8, by spring 12, the other end of which abuts against collar 13 which is fast between the end of sleeve 8 and the face of thrust bearing 7. The distance between the two shoulders formed on sleeve 8, and the length of the bearing portion of gear 10, are such that the gear can turn freely on the sleeve without being bound by the pressure of washer 11. Meshing with gear 10 is a second gear 12 which is slidably keyed to shaft 16 which is journaled in frame 3 and driven by a suitable source of power.

Upon nut 4 are formed one or more splines or keys 18, which engage corresponding grooves or keyways cut in the interior surface of clutch 17 which is concentric with nut 4 and slidable with relation thereto, but which is compelled by these keys to rotate with the nut. Clutch 17 is counterbored at its lower end to form a recess to contain helical spring 19, which is coaxial with nut 4 and clutch 17. One end of spring 19 abuts against sleeve 8, while the other end abuts against the lower ends of the splines cut on nut 4 and the upper end of the counterbore in clutch 17 in which the spring is recessed. This spring serves to hold clutch 17 in such a position that the end of the counterbore is normally flush with the end of the splines.

Loosely concentric with nut 4 and screw 1 is bevel gear 23, driven by a suitable source of power, which may be different from the source of power driving shaft 16. Gear 23 has clutch teeth 22 at its lower end and turns freely in bushing 24 which is held securely to frame 3 by screw 26 passing through ear 25 formed on the bushing. At the lower end of the bushing 24 is a double helicoidal cam 27. This cam engages a complementary cam 28 formed on clutch shifting sleeve 29, which is concentric with and freely rotatable upon clutch 17. As may be seen from Figure 2, where one half the circumference of bushing 24 and sleeve 29 are illustrated, rotation of clutch shifting sleeve 29 in either direction causes it to move axially downward with a screw like motion. The part of the cam not shown is exactly similar to the part illustrated, the purpose of the second half being to balance the axial components of the cam forces. Coaxial with and securely fastened to sleeve 29 is sector 30 in the form of a collar having gear teeth 31 by means of which sector 30 and sleeve 29 may be rotated. The lower end of sleeve 29 abuts against a shoulder formed on clutch 17, so that when sleeve 29 is rotated, clutch 17 is moved axially in a downward direction, withdrawing teeth 21 formed on its upper end from engagement with teeth 22 formed on the lower end of gear 23, compressing spring 19, and finally bringing teeth 20 formed on the lower end of clutch 17 into engagement with teeth 14 formed on the upper end of gear 10.

Teeth 31 formed on sector 30 engage with teeth 32 formed on sector 33 which is freely rotatable upon shaft 34. Projecting from the hub of sector 33 are lugs to which is pinned lever 36. The outer end of lever 36, which is shown broken off, has a handle by means of which it may be moved. The inner end projects into the recess 37 formed in sector 33 between the lugs mentioned above. If, however, the handle of lever 36 is raised until lever 36 occupies the position shown in dotted lines, the inner end of lever 36 will engage a slot formed in the upper surface of collar 35 slidably keyed to shaft 34. Consequently if lever 36 is in the position shown by the full lines, shaft 34 and collar 35 may turn freely without interfering with lever 36 or sector 33. If, however, the lever is moved by hand to the position shown by the dotted lines it now engages the slot in collar 35, and a movement of the lever about shaft 34 as a center, will rotate sector 33, collar 35 and shaft 34. Simultaneously teeth 32 will cause the rotation in the opposite direction of sector 30 which is fastened to clutch shifting cam 29 and the rotation of the cammed faces will cause the endwise movement of clutch shifting cam 29 and clutch member 17.

As clutch 17 is thus moved in a downward direction the sector teeth 31 slide by the sector teeth 32 since they are of sufficient length to permit this movement without disengagement of the gears. Also as clutch member 17 slides in a downward direction, clutch teeth 21 become disengaged from clutch teeth 22 so that the clutch member 17 and nut 4 splined thereto are no longer driven by gear 23. Further movement of the handle 36 and sleeve 29, cause clutch teeth 20 to engage clutch teeth 14 so that clutch member 17 and nut 4 splined thereto are then driven from shaft 16 through gears 15 and 10. Should the teeth 20 not enter the corresponding spaces between the teeth 14, gear 10 will be forced downward against spring 12 until clutch member 17 has completed its full movement of translation. As soon, however, as power from shaft 16 has rotated gear 10 sufficiently so that the space between its teeth are opposite teeth 20, spring 12 will force teeth 14 into engagement with teeth 20, restoring gear 10 to the position shown in Figure 1.

When nut 4 has been rotated sufficiently by power from shaft 16 and it is again desired to drive it from gear 23, handle 36 is restored to the initial position so that the cam faces of sleeve 29 and bushing 24 are in the relative position shown in Figure 2. This permits spring 19 to force clutch member 17, sleeve 29, and sector 30 into the position shown in Figure 1, thus permitting teeth 21 to re-engage with teeth 22. In case the teeth of one member do not enter the spaces between the teeth of the other member, spring 19 will maintain the ends of the teeth in contact until gear 23 is rotated sufficiently so that the spaces of one member will be opposite the teeth of the other member, when spring 19 will complete the axial movement, causing the engagement of the teeth.

The purpose of the rotation of rod 34 is to control by some suitable mechanism not shown and which does not form a part of this invention, the motion of shaft 16. The invention permits the rotation of shaft 34 by other means than collar 35 and handle 36, for the purpose of controlling the motion of shaft 16 when it is desired to supply power from this shaft to actuate similar or analogous mechanisms, without causing the declutching of the nut from gear 23 and its engagement with gear 10. Shaft 16 may act to supply power to apparatus different in structure from the apparatus shown but similar in general purpose, as for instance, that disclosed in the application from which this was divided.

The mechanism disclosed provides a compact structure adapted to and efficient for use in controlling the feed mechanism and rapid traverse mechanism of machine tools.

Having described our invention, we claim:

1. In a mechanism of the class described, a supporting frame, means adapted by rotation to move the supporting frame, a movable clutch member concentric therewith and slidably keyed thereto, a first clutch, a second clutch, and a clutch shifting member concentric with the movable clutch member and adapted by partial rotation to shift the movable clutch member axially from engagement with the first clutch into engagement with the second clutch.

2. In a mechanism of the class described, a fixed screw, a nut rotatable on said screw, a movable clutch member concentric therewith and slidably keyed to said nut, a first clutch, a second clutch, and a clutch shifting member concentric with said movable clutch member and adapted by partial rotation to shift it out of engagement with the first clutch and into engagement with the second clutch.

3. In a mechanism of the class described, a fixed screw, a power shaft parallel therewith, a gear slidably keyed to the power shaft, a clutch gear meshing with the slidably keyed gear and concentric with the fixed screw, a nut rotatable on the fixed screw, a movable clutch member concentric with and slidably keyed to the nut, a second clutch gear drivable by independent power, and a clutch shifting member concentric with the movable clutch member and adapted by partial rotation to shift it out of engagement with the second clutch gear and into engagement with the first clutch gear.

4. In a mechanism of the class described, a supporting frame, means adapted by rotation to move the supporting frame, a movable clutch member concentric therewith and slidably keyed thereto, a fixed member having cammed faces, a rotatable clutch shifting member concentric with the movable clutch member, provided with cammed faces adapted to cooperate with the corresponding cammed faces on the fixed member, a first clutch journaled in the fixed member having cammed faces, a second clutch, a first spring normally maintained in partial compression for forcing the movable clutch member into engagement with the first clutch, a second spring normally maintained in partial compression and tending to maintain the second clutch in fixed axial position, and means for manually rotating the clutch shifting member.

5. In a mechanism of the class described, a driven member, transmission members concentric upon said driven member, a clutch member upon said driven member, rotatively fixed thereto and slidable axially thereof, said member being disposed between said transmission members for alternate engagement therewith, and a clutch shifting member concentric with said clutch member and in engagement therewith for sliding the same, said shifting member having a cam faced end for moving the shifter member longitudinally with a rotative movement thereof.

6. In a mechanism of the class described, a shaft, a pair of gears loose on said shaft, a sliding clutch member splined on said shaft, between said gears, for alternate connection therewith, and yieldingly urged in a direction to engage with one of said gears, a rotatable clutch shifting member loosely concentrically mounted upon said clutch member in engagement therewith for longitudinal movement therewith, said shifting member having means for moving the same longitudinally with the rotation thereof.

In witness whereof, we hereunto subscribe our names.

HOWARD W. HUNT.
FORREST E. CARDULLO.